United States Patent
Esser et al.

(10) Patent No.: US 8,899,961 B2
(45) Date of Patent: Dec. 2, 2014

(54) MOLD-TOOL ASSEMBLY INCLUDING A HEATER HAVING A RESISTIVE ELEMENT ENCASED IN ALUMINUM NITRIDE

(75) Inventors: Brian Esser, Colchester, VT (US); Stephen Linwood Gray, Colchester, VT (US)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 102 days.

(21) Appl. No.: 13/809,217

(22) PCT Filed: Jul. 26, 2011

(86) PCT No.: PCT/US2011/045277
§ 371 (c)(1),
(2), (4) Date: Feb. 5, 2013

(87) PCT Pub. No.: WO2012/015778
PCT Pub. Date: Feb. 2, 2012

(65) Prior Publication Data
US 2013/0202730 A1    Aug. 8, 2013

Related U.S. Application Data

(60) Provisional application No. 61/368,669, filed on Jul. 29, 2010.

(51) Int. Cl.
*B29C 45/73*  (2006.01)
*B29C 45/74*  (2006.01)
*B29C 45/27*  (2006.01)

(52) U.S. Cl.
CPC ............. *B29C 45/74* (2013.01); *B29C 45/2737* (2013.01); *B29C 2045/2743* (2013.01); *B29C 2045/2745* (2013.01); *B29C 2045/2748* (2013.01)
USPC ....... 425/547; 425/549; 425/572; 264/328.15

(58) Field of Classification Search
USPC ............................... 425/549, 572; 264/328.15
See application file for complete search history.

(56) References Cited

U.S. PATENT DOCUMENTS

| | | | |
|---|---|---|---|
| 4,268,241 A | 5/1981 | Rees et al. | |
| 4,516,927 A | 5/1985 | Yoshida | |
| 4,704,516 A | 11/1987 | Tsutsumi | |
| 7,143,496 B2 | 12/2006 | Guenther | |
| 7,713,052 B2 * | 5/2010 | Yorita et al. | ........ 425/384 |

(Continued)

FOREIGN PATENT DOCUMENTS

| | | |
|---|---|---|
| CN | 1964831 A | 5/2007 |
| CN | 101722626 A | 6/2010 |
| DE | 102006053001 A1 | 5/2008 |
| JP | 2006026967 A | 2/2006 |

OTHER PUBLICATIONS

"Thick Film Heaters", retrieved from Internet URL: http://web.archive.org/web/20070823123524/http://www.proheatinc.com/products/heaters/moldcomponants/thick_film.html; Aug. 23, 2007; XP055103190; p. 1.

(Continued)

*Primary Examiner* — Tim Heitbrink

(57) ABSTRACT

A mold-tool assembly, comprising: a heater being configured to heat (in use), at least a portion of a component, the heater having a resistive element being encased, at least in part, in aluminum nitride.

8 Claims, 2 Drawing Sheets

(56) References Cited

U.S. PATENT DOCUMENTS

Figure 1:
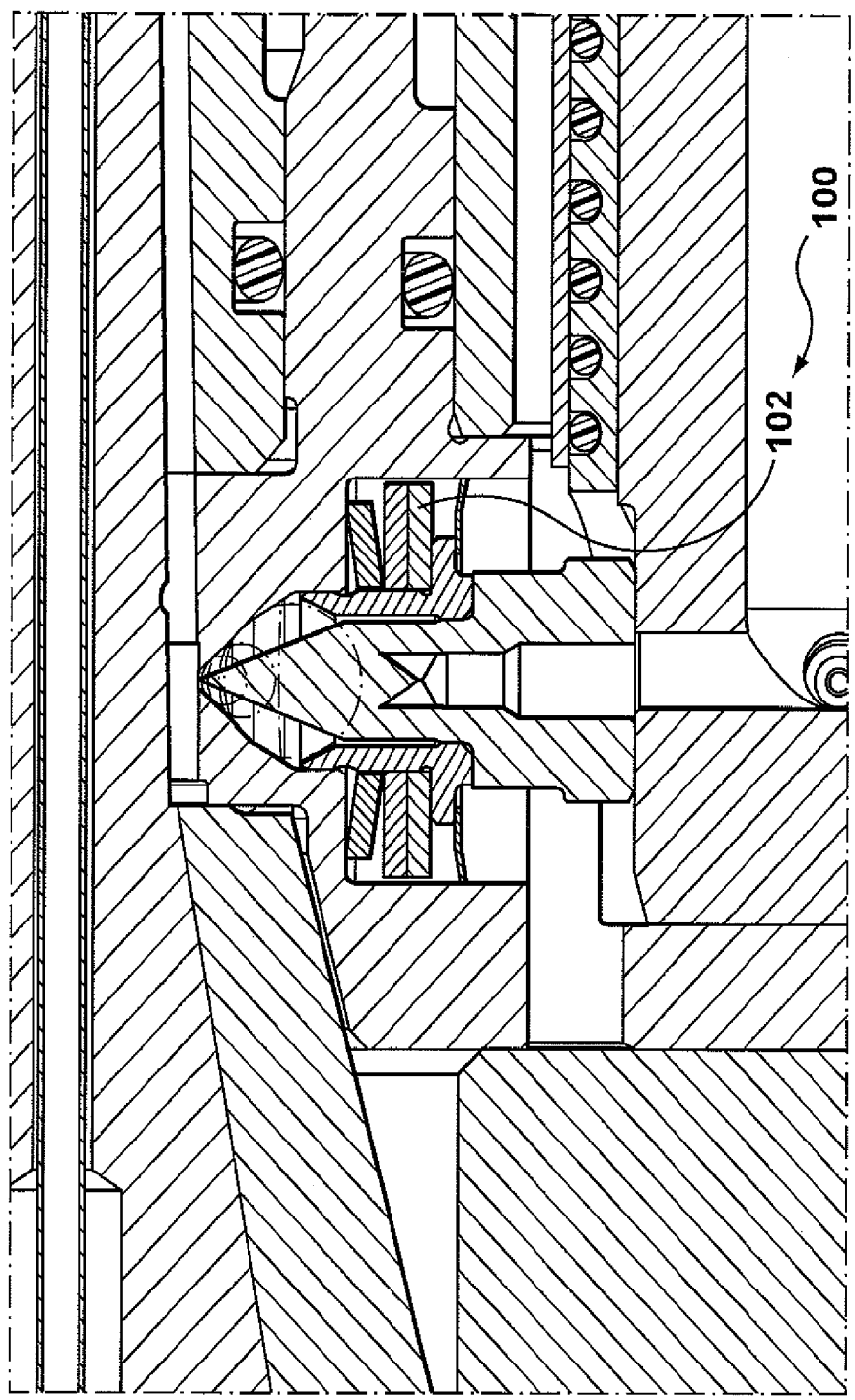

| | | | |
|---|---|---|---|
| 8,029,262 B2 * | 10/2011 | Gouko et al. | 425/107 |
| 2008/0145797 A1 * | 6/2008 | Verbeke et al. | 430/322 |
| 2009/0001066 A1 | 1/2009 | Pilavdzic et al. | |

OTHER PUBLICATIONS

European Search Report; Gemeinböck, Gerald, May 16, 2014, 6 pages.

* cited by examiner

MOLD-TOOL ASSEMBLY INCLUDING A HEATER HAVING A RESISTIVE ELEMENT ENCASED IN ALUMINUM NITRIDE

TECHNICAL FIELD

The subject matter generally relates to (and is not limited to) a mold-tool assembly, comprising: a heater providing, in use, heat to, at least a portion of, a component, the heater having a resistive element being encased, at least in part, in aluminum nitride.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was expensive to produce, prone to cracking, and highly flammable. In 1868, American inventor John Wesley HYATT developed a plastic material he named Celluloid, improving on PARKES' concept so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The amount of total clamp force is determined by the projected area of the part being molded. This projected area is multiplied by a clamp force of from two to eight tons for each square inch of the projected areas. As a rule of thumb, four or five tons per square inch can be used for most products. If the plastic material is very stiff, more injection pressure may be needed to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

Nozzle tips are difficult to heat directly and precisely due to size, space, and lead wire constraints. When typical oxide insulated ni-chrome wire based heaters are utilized, the heat must be conducted to the tip through the various materials comprising the nozzle system. Ni-chrome wire is also known as nickel-chromium resistance wire. This arrangement puts disadvantageous limitations on geometries and configurations of the heaters.

According to one aspect, there is provided a mold-tool assembly, comprising: a component; and a heater providing, in use, heat to, at least a portion of, the component, the heater having a resistive element being encased, at least in part, in aluminum nitride.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

Figure 2:
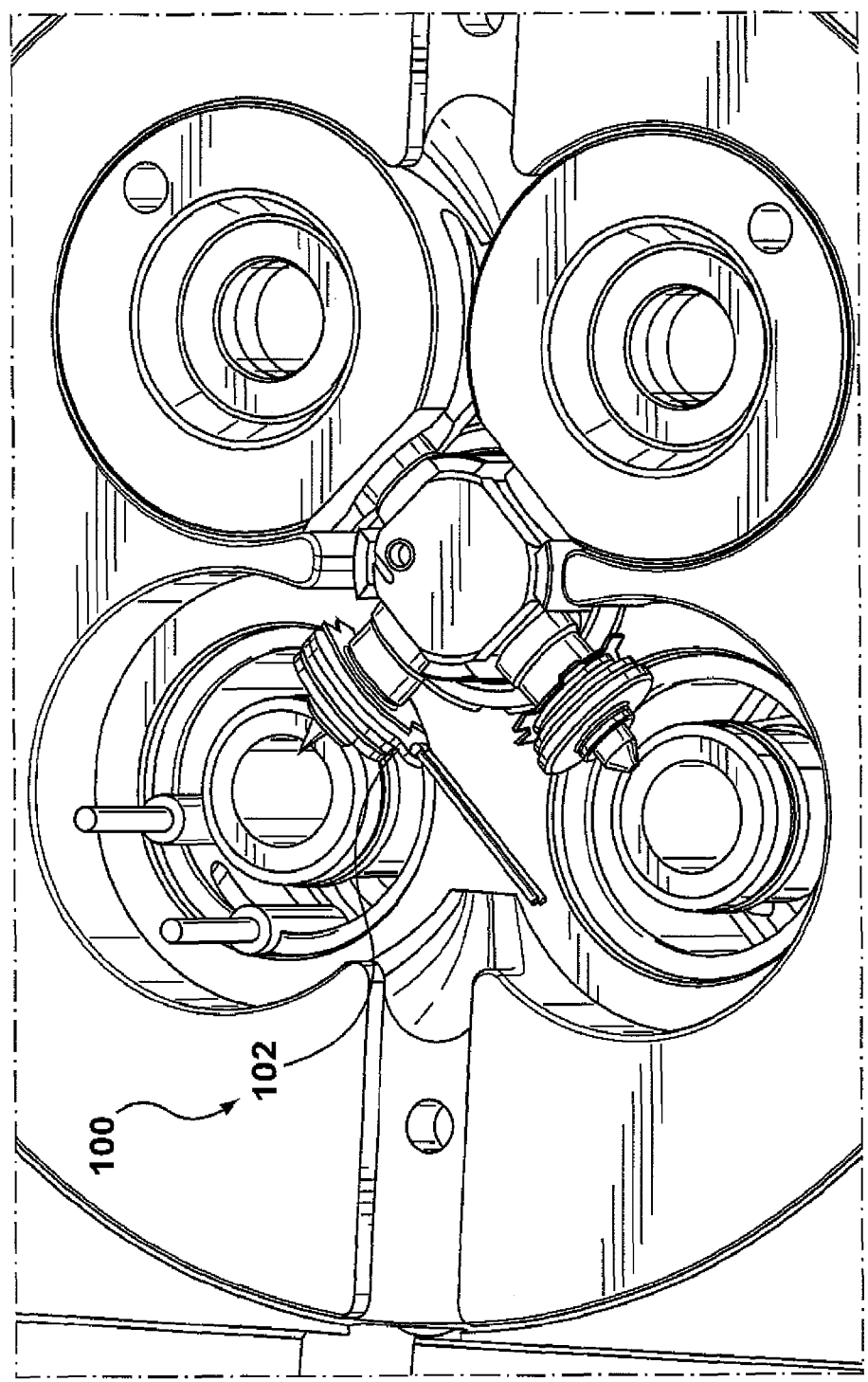

The non-limiting embodiments will be more fully appreciated by reference to the following detailed description of the non-limiting embodiments when taken in conjunction with the accompanying drawings, in which:

FIG. 1 depicts a schematic representation of a mold-tool assembly (100); and FIG. 2 depicts another schematic representation of the mold-tool assembly (100).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIG. 1 depicts the mold-tool assembly (100). The mold-tool assembly (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (and is not limited to)" is equivalent to the word "comprising". The word "comprising" is a transitional phrase or word that links the preamble of a patent claim to the specific elements set forth in the claims which define what the present invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

The mold-tool assembly (100) uses a small compact high wattage heater to heat an injection molding nozzle tip (or a nozzle tip). The heater is made of a resistive element encased in aluminum nitride. Aluminum nitride has the advantage of being dense, has good dielectric properties, good thermal conductivity, and high temperature resistance. The combination of high wattage and small size allow this heater to be placed in close proximate (near) to the nozzle tip so as to permit or allow more direct heating and increased control of the actual nozzle tip. In one option, the heater may be placed proximate to the nozzle tip, so that the heater provides direct heat to the nozzle tip. The construction method and materials may also provide for a moisture-sealed heater. This configuration may be used in hot runner nozzles, edge gate nozzles, and side gate nozzles. The heater may have a variety of geometric configurations, including (and not limited to): flat, cylindrical, or conical. Portions of the heater may define the melt channel passageways if so desired.

FIG. 1 depicts an example configuration of the mold-tool assembly (100), such as a side gating style hot runner. Many other implementation configurations are possible. The mold-tool assembly (100) includes (and is not limited to): (i) a component, and (ii) a heater (102) configured to heat, at least a portion of, the component (also known as a part or structural element, etc). It is understood that the heater (102) provides, in use, heat to, at least a portion of, the component. The heater has a resistive element that is encased, at least in part, in aluminum nitride. The component may include a nozzle tip. The component may include or may define a melt channel that is configured to contain a plastic resin, and the heater is configured to provide (in use) heat to, at least a portion of, the plastic resin. The melt channel contains, in use, the plastic resin. The heater may be placed proximity to the nozzle tip, whereby the heater thus so placed allows more direct heating and increased heating control of the nozzle tip. The heater may define, at least in part, a melt channel. According to an example the heater may define, at least in part, a gate orifice (not depicted). According to another example, the heater may define, at least in part, a molding surface (not depicted).

FIG. 2 depicts another example of the mold-tool assembly (100) having an aluminum nitride encased resistive heating element. FIG. 2 depicts a section through both the injection molding nozzle with heater, and the injection molding nozzle tip without heater It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim. It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope of the independent claims. It is understood that the non-limiting embodiments are merely illustrative.

What is claimed is:

1. A mold-tool assembly for processing a plastic resin, comprising:
   a component; and
   a heater providing, in use, heat to, at least a portion of, the component, the heater having a resistive element being encased, at least in part, in aluminum nitride.
2. The mold-tool assembly of claim 1, wherein:
   the component includes a nozzle tip.
3. The mold-tool assembly of claim 2, wherein:
   the heater provides direct heat to the nozzle tip.
4. The mold-tool assembly of claim 1, wherein:
   the heater defines, at least in part, a melt channel.
5. The mold-tool assembly of claim 1, wherein:
   the heater defines, at least in part, a gate orifice.
6. The mold-tool assembly of claim 1, wherein:
   the heater defines, at least in part, a molding surface.
7. The mold-tool assembly of claim 1, wherein:
   the component includes:
     a melt channel containing, in use, the plastic resin, and the heater provides, in use, heat to, at least a portion of, the plastic resin.
8. The mold-tool assembly of claim 1, wherein:
   the component defines, at least in part, a melt channel.

* * * * *